(12) United States Patent
Hoogland

(10) Patent No.: US 7,685,967 B2
(45) Date of Patent: Mar. 30, 2010

(54) FEED CAKE ASSEMBLY

(75) Inventor: Frank M Hoogland, Zeeland, MI (US)

(73) Assignee: Seed Resources, LLC, Grand Rapids, MI (US)

( * ) Notice: Subject to any disclaimer, the term of this patent is extended or adjusted under 35 U.S.C. 154(b) by 557 days.

(21) Appl. No.: 11/533,885

(22) Filed: Sep. 21, 2006

(65) Prior Publication Data

US 2007/0272162 A1 Nov. 29, 2007

Related U.S. Application Data

(60) Provisional application No. 60/747,944, filed on May 23, 2006.

(51) Int. Cl.
*A01K 39/01* (2006.01)
(52) U.S. Cl. .................................. 119/51.03
(58) Field of Classification Search ............. 119/51.03, 119/57.8; 426/1, 623
See application file for complete search history.

(56) References Cited

U.S. PATENT DOCUMENTS

| | | | | |
|---|---|---|---|---|
| 2,235,959 | A | * | 3/1941 | Copeman ................. 119/51.03 |
| 3,964,438 | A | * | 6/1976 | Rodemeyer ................. 119/28.5 |
| 5,052,342 | A | | 10/1991 | Schneider ................. 119/51.03 |
| 5,293,528 | A | | 3/1994 | DiSanto et al. |
| 5,606,933 | A | * | 3/1997 | Wilkins ................. 119/51.03 |
| 5,636,591 | A | | 6/1997 | Loiselle ................. 119/51.03 |
| 5,699,752 | A | * | 12/1997 | Wilkins ................. 119/51.03 |
| 5,745,094 | A | | 4/1998 | Gordon, II et al. |
| 5,826,541 | A | * | 10/1998 | Wilkins ................. 119/57.8 |
| 5,855,943 | A | * | 1/1999 | Lush et al. ................. 426/516 |
| 5,872,552 | A | | 2/1999 | Gordon, II et al. |
| 5,961,804 | A | | 10/1999 | Jacobson et al. |
| 6,024,047 | A | | 2/2000 | Hoogland ................. 119/51.03 |
| 6,144,361 | A | | 11/2000 | Gordon, II et al. |
| 6,172,798 | B1 | | 1/2001 | Albert et al. |
| 6,271,823 | B1 | | 8/2001 | Gordon, II et al. |
| 6,337,761 | B1 | | 1/2002 | Rogers et al. |
| 6,525,865 | B2 | | 2/2003 | Katase |
| 6,525,866 | B1 | | 2/2003 | Lin et al. |
| 6,529,313 | B1 | | 3/2003 | Lin et al. |
| 6,535,326 | B2 | | 3/2003 | Uno |
| 6,574,034 | B1 | | 6/2003 | Lin et al. |
| 6,591,779 | B1 | | 7/2003 | Hoogland ................. 119/51.03 |
| 6,636,341 | B2 | | 10/2003 | Kanbe |
| 6,639,580 | B1 | | 10/2003 | Kishi et al. |
| 6,650,462 | B2 | | 11/2003 | Katase |
| 6,650,463 | B2 | | 11/2003 | Obikawa et al. |
| 6,677,926 | B2 | | 1/2004 | Biegelsen |
| 6,680,726 | B2 | | 1/2004 | Gordon, II et al. |
| 6,806,995 | B2 | | 10/2004 | Chung et al. |
| 6,850,355 | B2 | | 2/2005 | Liang et al. |

(Continued)

OTHER PUBLICATIONS

Birdola website printouts totalling 14 pages disclosing Birdola feed cakes, Birdola feeders, and discussing what wild birds like to eat; printed on May 20, 2006.

*Primary Examiner*—Yvonne R. Abbott
(74) *Attorney, Agent, or Firm*—Clark Hill PLC

(57) ABSTRACT

A feed cake assembly includes at least a first portion formed from a first feed material combination and at least a second portion formed from a second feed material combination, the first portion and second portion being fused together to form the feed cake assembly. The first portion is preferably a seed cake portion formed from a first feed material combination and the second portion is preferably a flavor blend portion formed from a second feed material combination.

22 Claims, 1 Drawing Sheet

U.S. PATENT DOCUMENTS

| | | |
|---|---|---|
| 6,850,357 B2 | 2/2005 | Kaneko et al. |
| 6,859,302 B2 | 2/2005 | Liang et al. |
| 6,862,129 B2 | 3/2005 | Matsuda et al. |
| 6,865,012 B2 | 3/2005 | Liang et al. |
| 6,867,898 B2 | 3/2005 | Liang et al. |
| 6,873,451 B2 | 3/2005 | Ukigaya |
| 6,885,495 B2 | 4/2005 | Liang et al. |
| 6,897,996 B2 | 5/2005 | Ikeda et al. |
| 6,900,924 B2 | 5/2005 | Goden |
| 6,906,851 B2 | 6/2005 | Yuasa |
| 6,909,532 B2 | 6/2005 | Chung et al. |
| 6,922,275 B2 | 7/2005 | Ikeda |

\* cited by examiner

FEED CAKE ASSEMBLY

CROSS-REFERENCE TO RELATED APPLICATION

This application claims the benefit of U.S. provisional patent application Ser. No. 60/747,944, filed May 23, 2006, the entire disclosure of which is hereby incorporated herein by reference.

BACKGROUND OF THE INVENTION

The present invention relates generally to feed cakes for providing a food source to wildlife including, but not limited to, wild birds and the like.

Typically a person feeding wildlife, such as wild birds or the like, selects either loose seeds and feeds, suet based cakes, or seed based cakes. Each of these products has limits on the variety of species of wildlife that they will attract. While some manufacturers produce suet based cake made with seeds and/or fruits and flavorings throughout the suet, many birds will not feed on the suet to obtain the seeds and fruits they need.

It is desirable, therefore, to provide a feed cake that is able to provide a food source for a variety of species of wildlife, such as birds or the like, in a single assembly.

SUMMARY OF THE INVENTION

The present invention concerns a feed cake assembly that includes at least a first portion formed from a first feed material combination; and at least a second portion formed from a second feed material combination, the first portion and second portion being fused together to form the feed cake assembly. The first portion is preferably a seed cake portion formed from a first feed material combination and the second portion is preferably a flavor blend portion formed from a second feed material combination.

A typical wildlife feed cake is made with seeds, grains, nuts, fruits, etc. and is held together with a binder. The feed cake assembly in accordance with the present invention includes a seed cake portion that is manufactured with a second cake or flavor blend portion that can be located almost anywhere on or inside the seed cake portion. The second cake or flavor blend portion can be of any size and/or shape, and is preferably made from ingredients other than the typical seed blend. This second cake or flavor blend portion is fused or bonded permanently inside and/or against the seed cake portion.

This new feed cake assembly combines the seed based cake plus a second form of feeding products into one convenient feed cake assembly. The advantages are that this feed cake assembly will attract a wider variety of birds, and provide a more diverse diet, resulting in a healthier flock. The combination feed cake assembly advantageously provides each individual bird with its preference within one product at a single feeding station.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

The entire disclosure of the U.S. provisional patent application Ser. No. 60/747,944, filed May 23, 2006, is hereby incorporated herein by reference.

Figure 1:
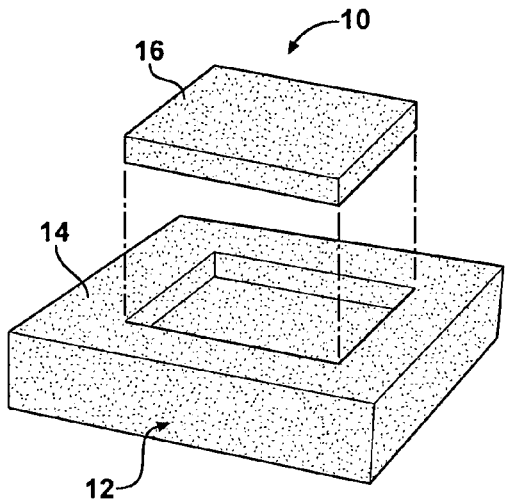
FIG. 1 is an exploded perspective view of a first embodiment of a feed cake assembly in accordance with the present invention.

Referring now FIG. 1, a first embodiment of a feed cake assembly in accordance with the present invention is indicated generally at 10. The feed cake assembly 10 includes a generally rectangular first or seed cake portion 12 formed from a first feed material combination. The first feed material combination may be formed from any suitable feed material or combination of feed materials including, but not limited to, seeds, grains, nuts, fruits, or the like and held together with a binder material, such as technical gelatin. Other suitable binder materials may be utilized, as will be appreciated by those skilled in the art. The seed cake portion 12 includes a recess 14 formed therein that is adapted to receive a flavor blend portion 16. The recess 14 is generally rectangular in shape and corresponds roughly in size to the flavor blend portion 16. The flavor blend portion 16 is formed from a second feed material combination. The second feed material combination may be formed from any suitable feed material or combination of feed materials including, but not limited to, seeds, grains, nuts, fruits or the like and held together with a suitable suet binder material. Other suitable binder materials may be utilized, as will be appreciated by those skilled in the art. Alternatively, the feed material of the flavor blend portion 16 includes bread or batter as part of the feed material.

The feed materials of the seed cake portion 12 and the feed materials of the flavor blend portion 16 are preferably formed from different types of seeds, grains, or nuts that advantageously enable the feed cake assembly 10 to attract, for example, numerous species of birds with a single feed cake assembly 10. In addition, the suet material of the flavor blend portion 16 advantageously attracts those types of birds who will consume the suet rather than just those birds interested in seeds and grains or the like.

Figure 2:
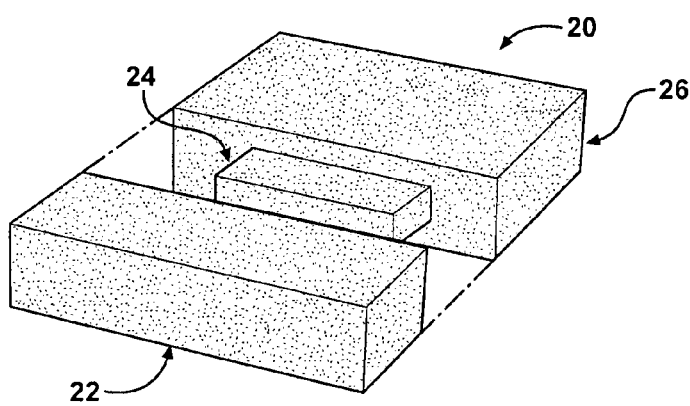
FIG. 2 is an exploded perspective view of an alternative embodiment of a feed cake assembly in accordance with the present invention.

Referring now to FIG. 2, a second embodiment of a feed cake assembly in accordance with the present invention is indicated generally at 20. The feed cake assembly 20 includes a generally rectangular first or seed cake portion 22 from a first feed material combination. The first feed material combination may be formed from any suitable feed material or combination of feed materials including, but not limited to, seeds, grains, nuts, fruits, or the like and held together with a binder material, such as technical gelatin. Other suitable binder materials may be utilized, as will be appreciated by those skilled in the art. The seed cake portion 12 is adapted to be attached to a flavor blend portion 26 via a flange 24 that extends from the flavor blend portion 26. The flange 24 preferably cooperates with a recess (not shown) formed in the seed cake portion 22 to attach the two portions 22 and 26 together to form the feed cake assembly 20. The flange 24 is generally rectangular in shape but may be formed in any shape, as will be appreciated by those skilled in the art. The flavor blend portion 26 is formed from a second feed material combination. The second feed material combination may be formed from any from any suitable feed material or combination of feed materials including, but not limited to, seeds, grains, nuts, fruits or the like and held together with a suitable suet binder material. Other suitable binder materials may be utilized, as will be appreciated by those skilled in the art. Alternatively, the feed material of the flavor blend portion 26 includes bread or batter as part of the feed material.

Similar to the feed cake assembly 10, the feed materials of the seed cake portion 22 and the feed materials of the flavor blend portion 26 are preferably formed from different types of seeds, grains, or nuts that advantageously enable the feed cake assembly 20 to attract, for example, numerous species of birds with a single feed cake assembly 20.

Figure 3:
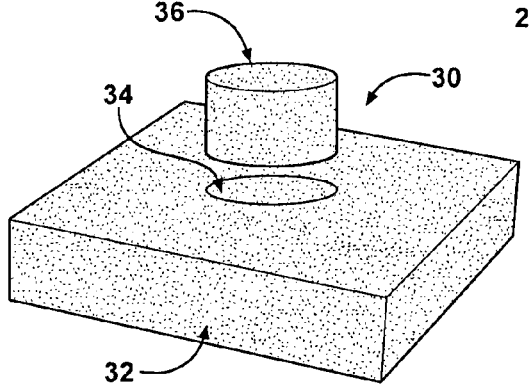
FIG. 3 is an exploded perspective view of another alternative embodiment of a feed cake assembly in accordance with the present invention.

Referring now to FIG. 3, a third embodiment of a feed cake assembly in accordance with the present invention is indicated generally at 30. The seed cake 30 includes a generally rectangular first or seed cake portion 32 formed from a first feed material combination. The first feed material combination may be from any suitable feed material or combination of feed materials including, but not limited to, seeds, grains, nuts, fruits, or the like and held together with a binder material, such as technical gelatin. Other suitable binder materials may be utilized, as will be appreciated by those skilled in the art. The seed cake portion 32 includes a recess 34 formed therein that is adapted to receive a flavor blend portion 36. The recess 34 is generally circular in shape and corresponds roughly in size to the disk-shaped flavor blend portion 36. The flavor blend portion 36 is also formed from a second feed material combination. The second feed material combination may be formed from any from any suitable feed material or combination of feed materials including, but not limited to, seeds, grains, nuts, fruits or the like and held together with a suitable suet binder material. Other suitable binder materials may be utilized, as will be appreciated by those skilled in the art. Alternatively, the feed material of the flavor blend portion 36 includes bread or batter as part of the feed material.

Similar to the feed cake assembly 10, the feed materials of the seed cake portion 32 and the feed materials of the flavor blend portion 36 are preferably formed from different types of seeds, grains, or nuts that advantageously enable the feed cake assembly 30 to attract, for example, numerous species of birds with a single feed cake assembly 30.

Figure 4:
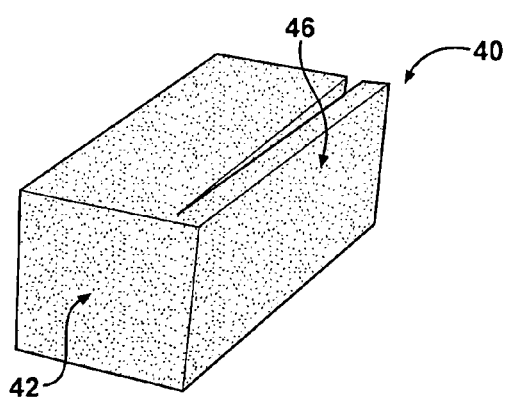
FIG. 4 is a partially exploded perspective view of another alternative embodiment of a feed cake assembly in accordance with the present invention.

Referring now to FIG. 4, a fourth embodiment of a feed cake assembly in accordance with the present invention is indicated generally at 40. The seed cake 40 includes a generally rectangular first or seed cake portion 42 formed from a first feed material combination. The first feed material combination may be formed from any suitable feed material or combination of feed materials including, but not limited to, seeds, grains, nuts, fruits, or the like and held together with a binder material, such as technical gelatin or the like. Other suitable binder materials may be utilized, as will be appreciated by those skilled in the art. The seed cake portion 42 is adapted to be attached to a flavor blend portion 46 along mating surfaces of the portions 42 and 46. The flavor blend portion 46 is also formed from a second feed material combination. The second feed material combination may be formed from any from any suitable feed material or combination of feed materials including, but not limited to, seeds, grains, nuts, fruits or the like and held together with a suitable suet binder material. Other suitable binder materials may be utilized, as will be appreciated by those skilled in the art. Alternatively, the feed material of the flavor blend portion 46 includes bread or batter as part of the feed material.

Similar to the feed cake assembly 10, the feed materials of the seed cake portion 42 and the feed materials of the flavor blend portion 46 are preferably formed from different types of seeds, grains, or nuts that advantageously enable the feed cake assembly 40 to attract, for example, numerous species of birds with a single feed cake assembly 40.

Preferably, the feed cake assembly 10 is formed by first mixing the suet and the feed materials of the second feed material combination of the flavor blend portion 16 and placing the mixed materials into a first portion of a mold (not shown) or the like. The flavor blend portion 16 may be formed into any desired shape, such as the shape shown in FIG. 1. The feed materials of the seed cake portion 12 are then mixed with the technical gelatin binder, which is warmed and in liquid form to form the first feed material combination, and the mixed materials of the first feed material combination are then poured into the flavor blend portion 16 into the mold. As the gelatin hardens it begins to bind with the flavor blend portion and the seed cake portion 12 and the flavor blend portion 16 are fused together, forming the feed cake assembly 10. Alternatively, the seed cake portion 12 could be first poured into a mold (not shown) and the flavor blend portion 16 could be formed into the desired shape and placed in the still-liquid seed cake portion 12. Similarly, as the gelatin hardens, the seed cake portion 12 and the flavor blend portion 16 become fused together and form the feed cake assembly 10.

The feed cake assembly 20 is preferably formed in a manner similar to the feed cake assembly 10 including the steps of mixing the feed materials and the binder material of the feed material combinations, forming the seed cake portion 22 and the flavor blend portion 26 into the desired shapes including the flange 24 and the recess and utilizing a mold or the like to fuse the seed cake portion 22 and the flavor blend portion 26 together.

The feed cake assembly 30 is preferably formed in a manner similar to the feed cake assembly 10 including the steps of mixing the feed materials and the binder material of the feed material combinations, forming the seed cake portion 32 and the flavor blend portion 36 into the desired shapes including the recess 34 and utilizing a mold or the like to fuse the seed cake portion 32 and the flavor blend portion 36 together.

The feed cake assembly 40 is preferably formed in a manner similar to the feed cake assembly 10 including the steps of mixing the feed materials and the binder material of the feed material combinations, forming the seed cake portion 42 and the flavor blend portion 46 into the desired shapes and utilizing a mold or the like to fuse the seed cake portion 42 and the flavor blend portion 46 together.

The seed cake portions 12, 22, 32, and 42, and the flavor blend portions 16, 26, 36, and 46 in accordance with the present invention may advantageously be formed into any suitable size or shape and may be attached to one another by a variety of means, as will be appreciated by those skilled in the art, while remaining within the scope of the present invention. Suitable shapes include, but are not limited to, circular, square, rectangular, triangular, or the like. The seed cake assemblies 10, 20, 30, and 40 are preferably formed in a shape that is adapted to cooperate with and fit into a feeder, for example a bird feeder, such as those commercially available from Birdola Products of Grand Rapids, Mich. and such as, but not limited to, those bird feeders shown in U.S. Pat. Nos. 6,024,047 and 6,591,779, and assigned to Seed Resources, LLC of Grand Rapids, Mich.

The feed cake assembly 10, 20, 30, and 40 in accordance with the present invention includes a seed cake portion that is manufactured with a second cake or flavor blend portion that can be located almost anywhere on, inside, or adjacent the seed cake portion. The second cake or flavor blend portion can be of any size and/or shape, and is made from ingredients other than the typical seed blend. This second cake or flavor blend portion is preferably fused or bonded permanently inside and/or against the seed cake portion. The feed cake assembly 10, 20, 30, and 40, advantageously provides each individual bird with its preference within one product at a single feeding station.

The feed cake assembly 10, 20, 30, and 40 in accordance with the present invention provides a food source for a plurality of wildlife species, such as wild birds or the like, within a single feed cake and at a single location, advantageously reducing the potential amount of food needed for an individual bird feeding station and allowing bird watchers a greater potential of time in which to view the birds at the feeding station.

While the assemblies 10, 20, 30, and 40 in accordance with the present invention have been described utilizing molds to form the assemblies, those skilled in the art will appreciate that the assemblies may be formed by utilizing molds, stamping, an extrusion process, or the like, while remaining within the scope of the present invention.

Furthermore, although not illustrated, those skilled in the art will appreciate that the feed cake assemblies 10, 20, 30, and 40, may be formed with two or more seed cake portions 12, 22, 32, and 42 and two or more flavor blend portions 16, 26, 36, and 46, such as by combining a seed cake portion having seeds and grains and another seed cake portion having fruits and nuts, a flavor blend portion having seeds, grains, fruits, and nuts and another flavor blend portion having bread and batter into a single feed cake assembly, while remaining within the scope of the present invention.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A feed cake assembly, comprising:
   at least a first portion formed from a first feed material combination, said first portion including a recess formed therein; and
   at least a second portion formed from a second feed material combination and disposed within said recess, said first portion and second portion being fused together to form said feed cake assembly.

2. The assembly according to claim 1 wherein said first feed material combination is a seed cake portion and includes at least one feed material and at least one binder material.

3. The assembly according to claim 2 wherein said at least one feed material is at least one of seeds, grains, fruits, and nuts.

4. The assembly according to claim 2 wherein said at least one binder material is technical gelatin.

5. The assembly according to claim 1 wherein said second feed material combination is a flavor blend portion and includes at least one feed material and at least one binder material.

6. The assembly according to claim 5 wherein said at least one feed material is at least one of seeds, grains, fruits, nuts, bread, and batter.

7. The assembly according to claim 5 wherein said at least one binder material is a suet material.

8. The assembly according to claim 1 wherein said second portion and said recess formed in said first portion are rectangular in shape.

9. A feed cake assembly, comprising:
   at least a first portion formed from a first feed material combination, said first portion including a recess formed therein; and
   at least a second portion formed from a second feed material combination, said second portion including a projection extending out therefrom and extending into said recess, said first portion and second portion being fused together to form said feed cake assembly.

10. The assembly according to claim 9 wherein said first feed material combination is a seed cake portion and includes at least one feed material and at least one binder material.

11. The assembly according to claim 10 wherein said at least one feed material is at least one of seeds, grains, fruits, and nuts.

12. The assembly according to claim 10 wherein said at least one binder material is technical gelatin.

13. The assembly according to claim 9 wherein said second feed material combination is a flavor blend portion and includes at least one feed material and at least one binder material.

14. The assembly according to claim 13 wherein said at least one feed material is at least one of seeds, grains, fruits, nuts, bread, and batter.

15. The assembly according to claim 13 wherein said at least one binder material is a suet material.

16. A feed cake assembly, comprising:
   at least a first portion formed from a first feed material combination; and
   at least a second portion formed from a second feed material combination, said first portion and second portion being fused together along respective mating surfaces to form said feed cake assembly.

17. The assembly according to claim 16 wherein said first feed material combination is a seed cake portion and includes at least one feed material and at least one binder material.

18. The assembly according to claim 17 wherein said at least one feed material is at least one of seeds, grains, fruits, and nuts.

19. The assembly according to claim 17 wherein said at least one binder material is technical gelatin.

20. The assembly according to claim 16 wherein said second feed material combination is a flavor blend portion and includes at least one feed material and at least one binder material.

21. The assembly according to claim 20 wherein said at least one feed material is at least one of seeds, grains, fruits, nuts, bread, and batter.

22. The assembly according to claim 20 wherein said at least one binder material is a suet material.

* * * * *